United States Patent
Park et al.

(10) Patent No.: US 10,565,495 B2
(45) Date of Patent: Feb. 18, 2020

(54) SYNAPSE AND NEUROMORPHIC DEVICE INCLUDING THE SAME

(71) Applicant: SK hynix Inc., Icheon (KR)

(72) Inventors: Sang-Su Park, Icheon (KR); Hyung-Dong Lee, Icheon (KR)

(73) Assignee: SK HYNIX INC., Icheon (KR)

( * ) Notice: Subject to any disclaimer, the term of this patent is extended or adjusted under 35 U.S.C. 154(b) by 548 days.

(21) Appl. No.: 15/389,139

(22) Filed: Dec. 22, 2016

(65) Prior Publication Data

US 2017/0193352 A1 Jul. 6, 2017

Related U.S. Application Data

(60) Provisional application No. 62/273,248, filed on Dec. 30, 2015.

(30) Foreign Application Priority Data

Nov. 4, 2016 (KR) .................. 10-2016-0146566

(51) Int. Cl.
*H01L 47/00* (2006.01)
*G06N 3/063* (2006.01)
*G06N 3/04* (2006.01)

(52) U.S. Cl.
CPC .......... *G06N 3/0635* (2013.01); *G06N 3/049* (2013.01)

(58) Field of Classification Search
None
See application file for complete search history.

(56) References Cited

U.S. PATENT DOCUMENTS

| | | | |
|---|---|---|---|
| 2011/0006275 A1* | 1/2011 | Roelofs | G11C 13/0007 257/2 |
| 2011/0297927 A1* | 12/2011 | Ramaswamy | G11C 13/0007 257/43 |
| 2013/0214237 A1* | 8/2013 | Tendulkar | H01L 45/08 257/4 |
| 2017/0109624 A1 | 4/2017 | Park et al. | |
| 2017/0221559 A1* | 8/2017 | Chen | G11C 13/0007 |

FOREIGN PATENT DOCUMENTS

| KR | 10-1239962 B1 | 3/2013 |
|---|---|---|
| KR | 10-2017-0045872 A | 4/2017 |

* cited by examiner

*Primary Examiner* — Ali Naraghi

(57) ABSTRACT

A neuromorphic device includes a synapse. The synapse includes a first electrode, a second electrode spaced apart from the first electrode, an oxygen-containing layer disposed between the first electrode and the second electrode, a reactive metal layer disposed between the oxygen-containing layer and the second electrode, and an oxygen diffusion-retarding layer disposed between the reactive metal layer and the oxygen-containing layer. The oxygen-containing layer includes a P-type material and oxygen ions. The reactive metal layer reacts with the oxygen ions of the oxygen-containing layer. The oxygen diffusion-retarding layer includes an N-type material and interferes with a movement of the oxygen ions from the oxygen-containing layer to the reactive metal layer. An interface between the oxygen-containing layer and the oxygen diffusion-retarding layer is a P-N junction.

22 Claims, 7 Drawing Sheets

SYNAPSE AND NEUROMORPHIC DEVICE INCLUDING THE SAME

CROSS-REFERENCE TO RELATED APPLICATIONS

The present application claims priority to U.S. Provisional Patent Application No. 62/273,248, filed on Dec. 30, 2015, and Korean Patent Application No. 10-2016-0146566, filed on Nov. 4, 2016, which are incorporated herein by reference in their entirety.

BACKGROUND

1. Field

Exemplary embodiments of the present disclosure relate to neuromorphic devices that mimic a human nervous system, and their applications.

2. Description of the Related Art

Recently, as electronic appliances trend toward miniaturization, low power consumption, high performance, multi-functionality, and so on, technology capable of efficiently processing large-volume information has been demanded. In particular, neuromorphic technology for mimicking neurobiological architectures present in a human nervous system has received much attention to implement the technology of efficiently processing large-volume information. The human nervous system includes several thousand billions of neurons and synapses serving as junctions between the respective neurons. In the neuromorphic technology, neuron circuits and synapse circuits, which correspond to neurons and synapses of the human nervous system, respectively, are designed to realize neuromorphic devices. The neuromorphic devices may be used in various applications including data classification, pattern recognition, and the like.

SUMMARY

Embodiments of the present disclosure are directed to a synapse having enhanced symmetry and linearity, and to a neuromorphic device including the same.

In accordance with an embodiment, a synapse includes: a first electrode; a second electrode spaced apart from the first electrode; an oxygen-containing layer disposed between the first electrode and the second electrode, the oxygen-containing layer including a P-type material and oxygen ions; a reactive metal layer disposed between the oxygen-containing layer and the second electrode, the reactive metal layer reacting with the oxygen ions of the oxygen-containing layer; and an oxygen diffusion-retarding layer disposed between the reactive metal layer and the oxygen-containing layer, the oxygen diffusion-retarding layer including an N-type material and interfering with a movement of the oxygen ions from the oxygen-containing layer to the reactive metal layer, and wherein an interface between the oxygen-containing layer and the oxygen diffusion-retarding layer is a P-N junction.

In the above embodiment, the synapse undergoes a reset operation when a reset voltage is applied to the synapse through the first electrode and the second electrode, the reset operation including forming or thickening a dielectric oxide layer in the reactive metal layer at an interface between the reactive metal layer and the oxygen diffusion-retarding layer, the reset voltage having a first polarity, and wherein the synapse undergoes a set operation when a set voltage is applied to the synapse through the first electrode and the second electrode, the set operation including removing or thinning the dielectric oxide layer, the set voltage having a second polarity opposite to the first polarity. During the reset operation, a reverse voltage is applied to the P-N junction, and wherein during the set operation, a forward voltage is applied to the P-N junction. The synapse undergoes a read operation when a read voltage is applied to the synapse through the first electrode and the second electrode, the read voltage having the first polarity and a magnitude that is smaller than a magnitude of the reset voltage. During the read operation, a reverse voltage is applied to the P-N junction. As a thickness of the dielectric oxide layer increases, an electrical conductivity of the synapse decreases, and wherein as the thickness of the dielectric oxide layer decreases, the electrical conductivity of the synapse increases. During the reset operation, a thickness of the dielectric oxide layer increases when a number of pulses of the reset voltage applied to the synapse increases, and wherein during the set operation, the thickness of the dielectric oxide layer decreases when a number of pulses of the set voltage applied to the synapse increases. During the reset operation, the pulses of the reset voltage have a constant width and a constant magnitude, and wherein, during the set operation, the pulses of the set voltage have a constant width and a constant magnitude. The oxygen diffusion-retarding layer has a thickness incompletely blocking the movement of the oxygen ions. The oxygen diffusion-retarding layer comprises a dielectric material, a semiconductor material, or a combination of the dielectric material and the semiconductor material. The synapse undergoes a depression operation when a number of first electrical pulses applied to the synapse through the first and second electrodes increases, an electrical conductivity of the synapse decreasing during the depression operation, the first electrical pulses having a first polarity, and wherein the synapse undergoes a potentiation operation when a number of second electrical pulses applied to the synapse through the first and second electrodes increases, an electrical conductivity of the synapse increasing during the potentiation operation, the second electrical pulses having a second polarity opposite to the first polarity. A change in the electrical conductivity of the synapse in the potentiation operation is substantially symmetric with a change in the electrical conductivity of the synapse in the depression operation. A rate of change in the electrical conductivity of the synapse in the potentiation operation is substantially constant, and a rate of change in the electrical conductivity of the synapse in the depression operation is substantially constant. The first electrical pulses have a constant width and a constant magnitude, and the second electrical pulses have a constant width and a constant magnitude. The electrical conductivity of the synapse is constant when third electrical pulses are applied to the first and second electrodes, the third electrical pulses having the first polarity or the second polarity, at least one of a width and a magnitude of each of the third electrical pulses being less than a certain critical value.

In accordance with another embodiment, a neuromorphic device includes: a first neuron; a second neuron; a first line connected to the first neuron, the first line extending in a first direction; a second line connected to the second neuron, the second line extending in a second direction and intersecting the first line; and a synapse disposed between the first line and the second line and located in an intersection region between the first line and the second line, wherein the synapse comprises: an oxygen-containing layer including a P-type material and oxygen ions; a reactive metal layer disposed between the oxygen-containing layer and the second line, the reactive metal layer reacting with the oxygen ions of the oxygen-containing layer; and an oxygen diffusion-retarding layer disposed between the reactive metal layer and the oxygen-containing layer, the oxygen diffusion-retarding layer including an N-type material and interfering with a movement of the oxygen ions from the oxygen-containing layer to the reactive metal layer, and wherein an interface between the oxygen-containing layer and the oxygen diffusion-retarding layer is a P-N junction.

In the above embodiment, the synapse undergoes a reset operation when a reset voltage is applied to the synapse through the first line and the second line, the reset operation including forming or thickening a dielectric oxide layer in the reactive metal layer at an interface between the reactive metal layer and the oxygen diffusion-retarding layer, the reset voltage having a first polarity, and wherein the synapse undergoes a set operation when a set voltage is applied to the synapse through the first line and the second line, the set operation including removing or thinning the dielectric oxide layer, the set voltage having a second polarity opposite to the first polarity. During the reset operation, a reverse voltage is applied to the P-N junction, and wherein during the set operation, a forward voltage is applied to the P-N junction. The synapse undergoes a read operation when a read voltage is applied to the synapse through the first line and the second line, the read voltage having the first polarity and having a smaller magnitude than the reset voltage. During the read operation, a reverse voltage is applied to the P-N junction. During the reset operation, a thickness of the dielectric oxide layer increases when a number of pulses of the reset voltage increases, and wherein during the set operation, the thickness of the dielectric oxide layer decreases when a number of pulses of the set voltage increases. During the reset operation, the pulses of the reset voltage have a constant width and a constant magnitude, and wherein during the set operation, the pulses of the set voltage have a constant width and a constant magnitude.

DETAILED DESCRIPTION

Figure 1:
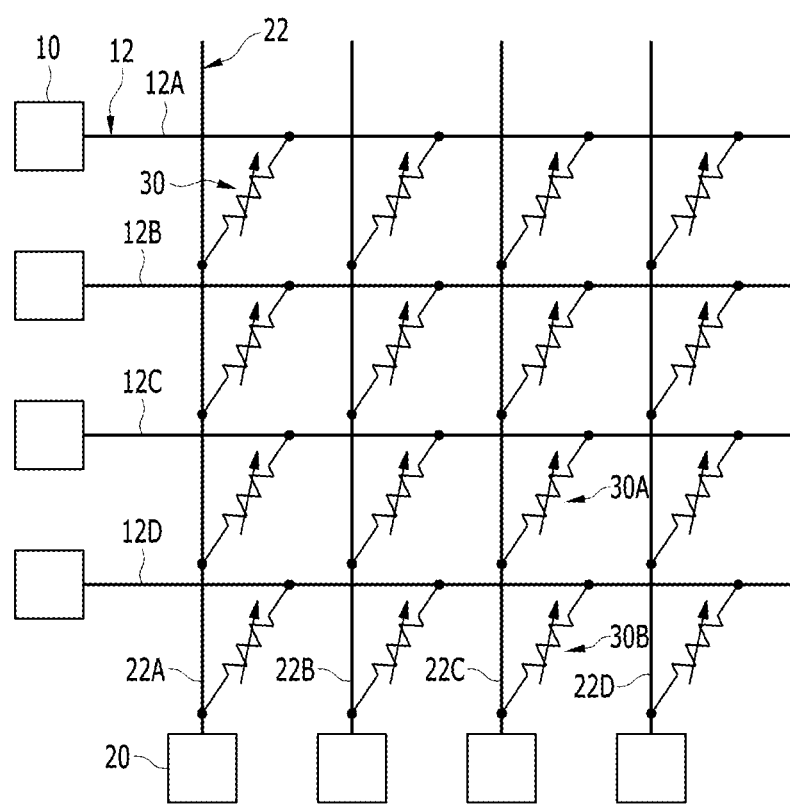
FIG. 1 illustrates a neuromorphic device according to an embodiment.

Various examples and implementations of the disclosed technology are described below in detail with reference to the accompanying drawings.

The drawings may not be necessarily to scale and in some instances, proportions of at least some of structures in the drawings may have been exaggerated in order to clearly illustrate certain features of the described examples or implementations. In presenting a specific example in a drawing or description having two or more layers in a multi-layer structure, the relative positioning relationship of such layers or the sequence of arranging the layers as shown reflects a particular implementation for the described or illustrated example and a different relative positioning relationship or sequence of arranging the layers may be possible. In addition, a described or illustrated example of a multi-layer structure may not reflect all layers present in that particular multilayer structure (e.g., one or more additional layers may be present between two illustrated layers). As a specific example, when a first layer in a described or illustrated multi-layer structure is referred to as being "on" or "over" a second layer or "on" or "over" a substrate, the first layer may be directly formed on the second layer or the substrate but may also represent a structure where one or more other intermediate layers may exist between the first layer and the second layer or the substrate.

FIG. 1 illustrates a neuromorphic device according to an embodiment.

Referring to FIG. 1, the neuromorphic device according to the embodiment may include a plurality of pre-synaptic neurons 10, a plurality of post-synaptic neurons 20, and a plurality of synapses 30 that provide connections between the plurality of pre-synaptic neurons 10 and the plurality of post-synaptic neurons 20.

For illustrative convenience, the neuromorphic device of the embodiment shown in FIG. 1 includes four pre-synaptic neurons 10, four post-synaptic neurons 20, and sixteen synapses 30, but the numbers of pre-synaptic neurons, post-synaptic neurons, and synapses in the neuromorphic device may be changed in various ways. If the number of pre-synaptic neurons 10 is N and the number of post-synaptic neurons 20 is M, N*M synapses 30 may be arranged in a matrix form, wherein N and M are natural numbers equal to or greater than 2, and N and M may or may not be equal to each other.

For this arrangement shown in FIG. 1, the neuromorphic device may further include a plurality of first lines 12 and a plurality of second lines 22. The plurality of first lines 12 may be coupled to the plurality of pre-synaptic neurons 10, respectively, and may extend in a first direction, for example, a horizontal direction with respect to the orientation of FIG. 1. The plurality of second lines 22 may be coupled to the plurality of post-synaptic neurons 20, respectively, and may extend in a second direction crossing the first direction, for example, a vertical direction with respect to the orientation of FIG. 1. Hereinafter, for convenience of explanation, the first lines 12 will be referred to as row lines, and the second lines 22 will be referred to as column lines. The plurality of synapses 30 may be disposed at intersections between the row lines 12 and the column lines 22. Each of the synapses 30 may couple a corresponding one of the row lines 12 to a corresponding one of the column lines 22. In other words, the plurality of synapses 30 may be disposed in regions where the row lines 12 overlap with the column lines 22. That is, each of the synapses 30 may be disposed in an intersection region between the corresponding row line 15 and the corresponding column line 25.

The pre-synaptic neurons 10 may generate a signal (e.g., a signal corresponding to certain data) and transmit the generated signal to the row lines 12. The post-synaptic neurons 20 may receive, through the column lines 22, a synaptic signal corresponding to the signal that was generated by the pre-synaptic neurons 10 and has passed through the synapses 30, and may process the received signal.

The row lines 12 may correspond to axons of the pre-synaptic neurons 10, and the column lines 22 may correspond to dendrites of the post-synaptic neurons 20. However, whether a neuron of interest is a pre-synaptic neuron or a post-synaptic neuron may be determined by its relationship with another neuron. For example, a neuron receiving a synaptic signal from another neuron may function as a post-synaptic neuron. Similarly, a neuron transmitting a signal to another neuron may function as a pre-synaptic neuron. The pre-synaptic neurons 10 and the post-synaptic neurons 20 may be implemented using various circuits such as complementary metal-oxide-semiconductor (CMOS) circuits.

The pre-synaptic neurons 10 and the post-synaptic neurons 20 are electrically coupled by the synapses 30. Herein, the synapse 30 is an element that has an electrical conductance or a weight changing according to an electrical pulse (e.g., a voltage or current) applied to the synapse 30.

Each of the synapses 30 may include a variable resistance element. The variable resistance element is an element capable of switching between different resistance states according to a voltage or current that is applied to both ends thereof. The variable resistance element may have a single-layered structure, or may have a multi-layered structure that includes any of various materials. The single-layered structure may have a plurality of resistance states by itself. The multi-layered structure may have a plurality of resistance states based on a combination of the various materials. The various materials may include any of metal oxides such as transition metal oxides or perovskite-based materials, phase-change materials such as chalcogenide-based materials, ferroelectric materials, ferromagnetic materials, and the like.

An operation in which the variable resistance element of the synapse 30 switches from a high-resistance state to a low-resistance state may be referred to as a set operation, and an operation in which the variable resistance element of the synapse 30 switches from the low-resistance state to the high-resistance state may be referred to as a reset operation.

However, unlike variable resistance elements that are used in memory devices such as RRAM, PRAM, FRAM, and MRAM devices, a resistance value of the synapse 30 in the neuromorphic device does not change abruptly in the set operation and the reset operation. Instead, the synapse 30 exhibits an analog behavior in which electrical conductivity of the synapse 30 gradually changes according to the number and/or magnitude of electrical pulses applied to the synapse 30 during the set operation and the reset operation. Thus, the synapse 30 may have various characteristics distinguishable from those of a variable resistance element of another type of memory device, because the characteristics of the synapse 30 in the neuromorphic device differ from characteristics required for a variable resistance element of another type of memory device.

On the other hand, another type of memory device preferably uses a variable resistance element that maintain its electrical conductivity before a set operation or a reset operation is performed, even if electrical pulses are repeatedly applied to the variable resistance element. Accordingly, the variable resistance element may store different data by having clearly distinguished low-resistance and high-resistance states.

Meanwhile, an example of a learning operation of the neuromorphic device of FIG. 1 will be described. For convenience of explanation, the four row lines 12 may be sequentially referred to as a first row line 12A, a second row line 12B, a third row line 12C, and a fourth row line 12D, as illustrated from the top to the bottom of FIG. 1. The four column lines 22 may be sequentially referred to as a first column line 22A, a second column line 22B, a third column line 22C, and a fourth column line 22D, as illustrated from the left to the right of FIG. 1.

Each of the synapses 30 may undergo a set operation by switching from a high-resistance state to a low-resistance state, and may undergo a reset operation by switching from a low-resistance state to a high-resistance state. An electrical conductivity of each of the synapses 30 increases during a potentiation operation, and decreases during a depression operation.

In an initial stage of the learning operation, each of the synapses 30 may be in a high-resistance state. If at least one of the synapses 30 is in a low-resistance state, an initialization operation for changing the low-resistance state of the synapses 30 to the high-resistance state may be performed in order to bring the synapses 30 to the initial stage.

Each of the synapses 30 may have a certain critical value. More specifically, if a voltage or current lower than the certain critical value is applied to the synapse 30, the electrical conductivity of the synapse 30 may not change, and if a voltage or current equal to or higher than the certain critical value is applied to the synapse 30, the electrical conductivity of the synapse 30 may change.

In the initial stage, in order to perform an operation for learning certain data in any column line 22, an input signal corresponding to the certain data may be input to the row lines 12 so that an electrical pulse is selectively applied to each of the row lines 12 according to the certain data. The input signal may be input by applying electrical pulses to row lines 12 corresponding to '1' in the certain data, and not to row lines 12 corresponding to '0' in the certain data. For example, if an input signal corresponding to certain data '0011' is input to the row lines 12 of FIG. 1, an electrical pulse may not be applied to the first and second row lines 12A and 12B, and may be applied to the third and fourth row lines 12C and 12D.

While the input signal is being input, the column lines 22 may be selectively driven at a suitable voltage or current for the learning operation.

As an example, if a column line 22 to learn specific data is predetermined, the predetermined column line 22 may be driven such that synapses 30 located at intersections between the row lines 12 corresponding to '1' and the predetermined column 22 may receive a voltage equal to or higher than a set voltage. The set voltage may be a voltage required for the set operation. Simultaneously, the remaining column lines 22, which are not the predetermined column line 22, may be driven such that the remaining synapses 30 may receive a voltage lower than the set voltage. Referring to FIG. 1, the remaining synapses are synapses other than the synapses 30 located at the intersections between the row lines 12 corresponding to '1' and the predetermined column lines 22.

For example, if the magnitude of the set voltage is Vset and the third column line 22C is predetermined as a column line to learn the certain data '0011,' the magnitude of the electrical pulse that is applied to each of the third and fourth row lines 12C and 12D may be equal to or higher than Vset, and a voltage that is applied to the third column line 22C may be 0 V, such that first and second synapses 30A and 30B located at intersections between the third column line 22C and the third and fourth row lines 12C and 12D receive a voltage equal to or higher than Vset. Thus, the first and second synapses 30A and 30B may switch from the high-resistance state to a low-resistance state. That is, each of the first and second synapses 30A and 30B may undergo the set operation.

The electrical conductivity of the first and second synapses 30A and 30B in the low-resistance state may gradually increase as the number of electrical pulses applied to the first and second synapses 30A and 30B increases. That is, each of the first and second synapses 30A and 30B may undergo a potentiation operation.

On the other hand, a voltage applied to the remaining column lines 22, that is, to the first, second, and fourth column lines 22A, 22B, and 22D, may have a magnitude between 0V and Vset such that the remaining synapses 30 receive a lower voltage than Vset. For example, the voltage applied to the remaining column lines 22 may be equal to ½ Vset. Thus, resistance states of the remaining synapses 30, which are synapses 30 other than the first and second synapses 30A and 30B, may not change.

If the row lines 12 and the column lines 22 are driven in the above-described manner, the electrical conductivity of synapses 30 that receive electrical pulses may gradually increase, and thus a current flowing through the synapses 30 that receive the electrical pulses may increase. For example, the electrical conductivity of the synapses 30A and 30B may increase when the synapses 30A and 30B receive the electrical pulses from the third and fourth row lines 12C and 12D, and a current flowing to the third column line 22C through the synapses 30A and 30B may increase. When the current flowing to the third column line 22C is measured and the measured current reaches a certain critical current, the third column line 22C may be a 'column line that has leaned specific data,' for example, a column line that has learned the certain data '0011.'

As another example, a column line 22 to learn specific data may not be predetermined. In this case, a current flowing to each of the column lines 22 is measured while electrical pulses corresponding to the specific data are applied to the row lines 12. Based on the measurement results, a column line, e.g., the first column line 22A, which reached the certain critical current before the other column lines, e.g., the second to fourth column lines 22B to 22D, may be determined to be a column line that has learned the specific data.

In the above-described manner, the other column lines may learn different data in other learning operations.

Meanwhile, although the learning operation described above includes only the set operation of changing the resistance state of the synapses 30 from a high-resistance state to a low-resistance state and the potentiation operation of increasing the electrical conductivity of the synapses 30, the learning operation may also include the reset operation of changing the resistance state of the synapses 30 from the low-resistance state to the high-resistance state and the depression operation for reducing the electrical conductivity of the synapses 30.

For example, the polarity of pulses that are applied in the set operation of the synapses 30 and the potentiation operation of increasing the electrical conductivity of the synapses 30 may be opposite to the polarity of pulses that are applied in the reset operation of the synapses 30 and the depression operation of reducing the electrical conductivity of the synapses 30.

Hereinafter, characteristics of a synapse suitable for a neuromorphic device will be described in detail with reference to FIGS. 2A to 2D.

FIGS. 2A to 2D illustrate characteristics associated with each of the synapses 30 shown in FIG. 1.

Figure 2A:
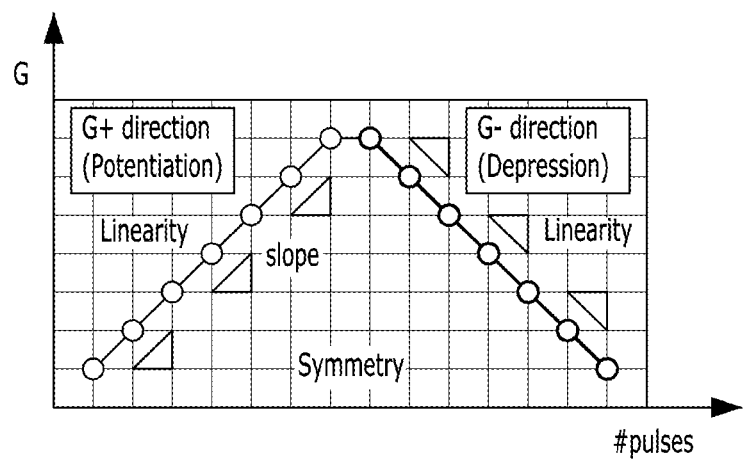
FIGS. 2A to 2D illustrate characteristics of each synapse of the neuromorphic device shown in FIG. 1.
Figure 2B:
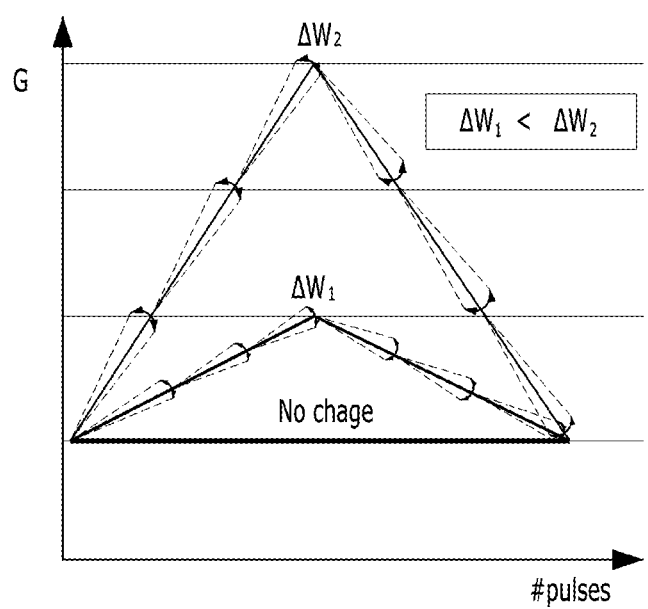
Figure 2C:
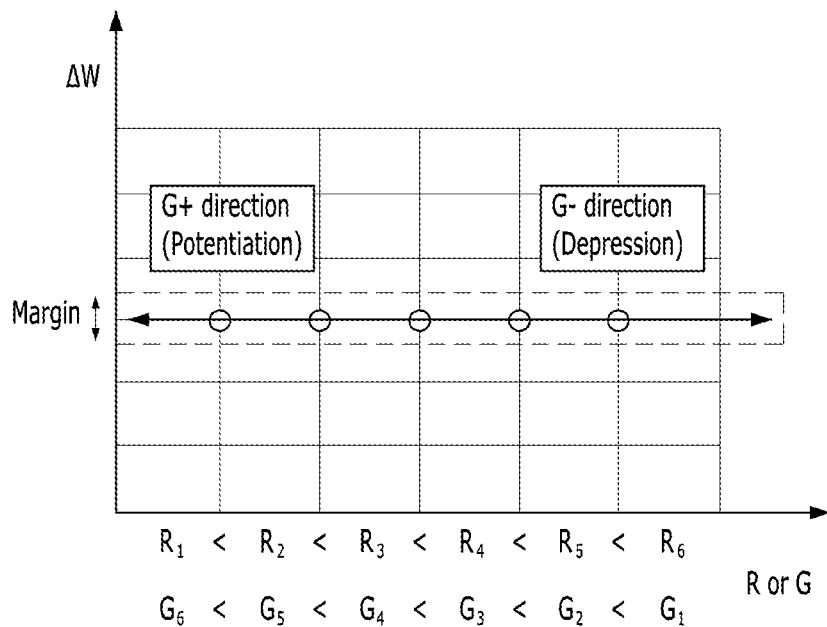
Figure 2D:
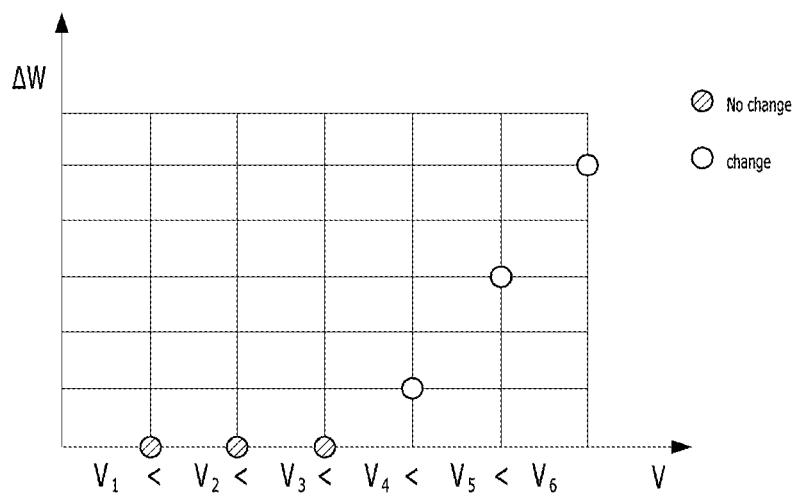

Specifically, FIGS. 2A and 2B illustrate the electrical conductivity G of a synapse 30 according to the number of electrical pulses that are applied to the synapse 30. FIG. 2C shows a change in weight $\Delta W$ of the synapse 30 with a change in a resistance value R or electrical conductivity G of the synapse 30. FIG. 2D shows the change in weight $\Delta W$ of the synapse 30 according to a magnitude of a voltage V that is applied to the synapse 30.

Referring to FIGS. 2A and 2B, if first-polarity voltage pulses (e.g., negative voltage pulses) with a voltage higher than a certain critical value are repeatedly applied to the synapse 30 that is in a low-resistance state, the electrical conductivity G of the synapse 30 may gradually increase. A direction in which the electrical conductivity G of the synapse 30 increases may be referred to as a G+ direction or a potentiation direction.

If second-polarity voltage pulses (e.g., positive voltage pulse) with a voltage equal to or higher than the reset voltage are applied to the synapse 30, the reset operation may be performed, such that the resistance state of the synapse 30 changes to a high-resistance state.

If second-polarity voltage pulses are repeatedly applied to the synapse 30 when the synapse 30 is in the high-resistance state, the electrical conductivity G of the synapse 30 may gradually decrease. A direction in which the electrical conductivity G of the synapse 30 decreases may be referred to as a G− direction or a depression direction.

If first-polarity voltage pulses with a voltage equal to or higher than the set voltage are applied again to this synapse 30, the set operation may be performed so that the resistance state of the synapse 30 changes again to the low-resistance state.

Herein, it is preferable that, if the magnitude and width of pluses are constant, a change in the electrical conductivity G of the synapse 30 in the potentiation operation be substantially symmetric with a change in the electrical conductivity G of the synapse 30 in the depression operation, and a rate of change in the electrical conductivity G is substantially constant in each of the potentiation operation and the depression operation. In other words, it is preferable that the electrical conductivity G of the synapse 30 has linearity and symmetry in the potentiation operation and the depression operation, such that a resistance value of the synapse 30 does not abruptly change in the set operation or the reset operation. If the magnitude and/or width of the pulses must be varied to secure the linearity and symmetry of the synapse 30, it may be necessary to implement additional circuits in the neuromorphic device to generate various pulses. The addition of additional circuits may be disadvantageous in terms of area or power. Therefore, it is preferable to control the pulses to have the constant magnitude and width while driving the synapse 30.

The linearity and symmetry of the electrical conductivity G of the synapse 30 in the potentiation operation and the depression operation may be observed in both the case in which a rate of change in the weight of the synapse 30 is small (see $\Delta W1$ in FIG. 2B) and the case in which the rate of change in the weight of the synapse 30 is great (see $\Delta W2$ in FIG. 2B). However, if the magnitude or width of pulses is not sufficiently large, the electrical conductivity G of the synapse 30 may not change regardless of the number of the pulses being applied to the synapse 30.

Referring to FIG. 2C, it is preferable that the rate of change in the weight $\Delta W$ of the synapse 30 be substantially constant regardless of a present state of the synapse 30, that is, the present resistance value R or present electrical conductivity G of the synapse 30.

Referring to FIG. 2D, when a voltage equal to or lower than a certain critical value is applied, for example, $V_3$, the weight W and/or electrical conductivity G of the synapse 30 may not change. Namely, the rate of change in the weight ΔW of the synapse 30 may be 0. On the other hand, at a voltage higher than the certain critical value $V_3$, for example, a voltage equal to or higher than $V_4$, the rate of change in the weight ΔW of the synapse 30 may increase. Herein, the rate of change in the weight ΔW of the synapse 30 may increase substantially in proportion to the magnitude of the voltage applied to the synapse 30.

In summary, it is preferable that the electrical conductivity G of the synapse 30 of the neuromorphic device increase or decrease substantially in proportion to the number of electrical pulses being applied to the synapse 30, regardless of the present state of the synapse 30. It is also preferable that a change in the electrical conductivity G of the synapse 30 in the potentiation operation be symmetric with a change in the electrical conductivity G of the synapse 30 in the depression operation. Herein, it is preferable that the change in the electrical conductivity G of the synapse 30 occur only at a voltage equal to or higher than the certain critical value. As the characteristics of the synapse 30 are closer to the above-described characteristics, the learning and recognition accuracy of the neuromorphic device may increase, and thus operating characteristics of the neuromorphic device may be improved.

Embodiments of the present disclosure are directed to a synapse capable of satisfying the above-described characteristics shown in FIGS. 2A to 2D to the maximum possible extent. Prior to the description of the embodiments, a synapse of a comparative example will be described.

Figure 3A:
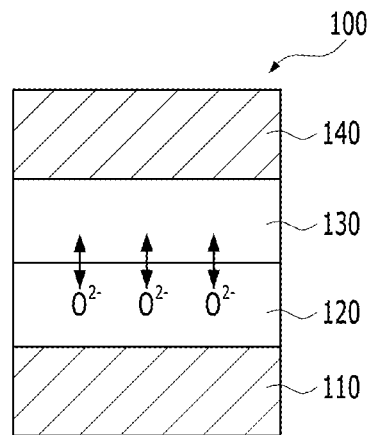
FIG. 3A is a cross-sectional view illustrating a synapse of a comparative example.
Figure 3B:
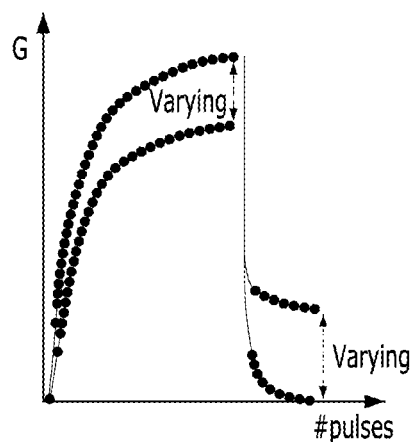
FIGS. 3B and 3C illustrate characteristics of the synapse shown in FIG. 3A.
Figure 3C:
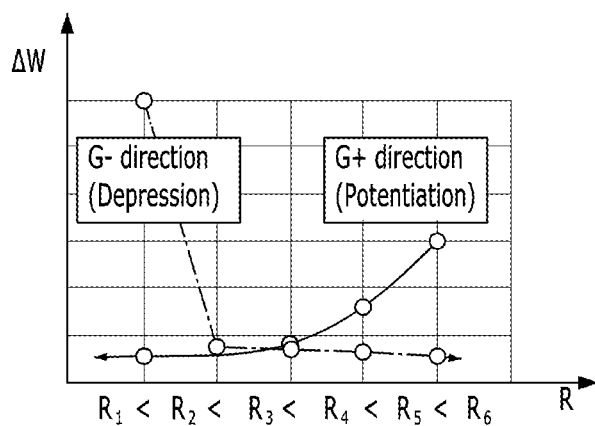

FIG. 3A is a cross-sectional view illustrating a synapse of a comparative example, and FIGS. 3B and 3C illustrate characteristics of the synapse shown in FIG. 3A.

Referring to FIG. 3A, the synapse 100 of the comparative example may include a first electrode 110, a second electrode 140, an oxygen-containing layer 120 disposed between the first electrode 110 and the second electrode 140, and a reactive metal layer 130 interposed between the oxygen-containing layer 120 and the second electrode 140. The reactive metal layer 130 is capable of reacting with oxygen ions of the oxygen-containing layer 120.

The first and second electrodes 110 and 140 may be disposed at two ends of the synapse 100 to which a voltage or current is applied, and may be formed of any of various electrically conductive materials such as metals or metal nitrides. The first electrode 110 may be connected to one of a corresponding row line 12 and a corresponding column line 22 shown in FIG. 1, and the second electrode 140 may be connected to the other one of the corresponding row line 12 and the corresponding column line 22, whereby the synapse 100 may be driven by electrical pulses. At least one of the first and second electrodes 110 and 140 may be omitted, such that the row line 12 or the column line 22 that is supposed to be coupled to the omitted electrode can function as the omitted electrode.

The oxygen-containing layer 120 is a layer containing oxygen ions, and may include any of various metal oxides, for example, oxides of transition metals such as Ti, Ni, Al, Nb, Hf, and V; perovskite-based oxides such as $Pr_{1-x}Ca_xMnO_3$(PCMO) and $La_{1-x}Sr_xMnO_3$(LCMO), and the like.

The reactive metal layer 130 is a layer capable of reacting with oxygen ions to form a dielectric oxide, and may include a metal such as Al, Ti, Ta, or Mo, or a nitride of the metal.

In an initial stage, the synapse 100 may be in a relatively low resistance state. Thus, to perform an operation of a neuromorphic device, an initialization operation for changing the synapse 100 from the low-resistance state to a high-resistance state may be required.

If voltage pulses with a certain polarity are applied through the first and second electrodes 110 and 140 to the synapse 100 when the synapse 100 in the low-resistance state, oxygen ions in is the oxygen-containing layer 120 may move toward the reactive metal layer 130 and then react with a metal included in the reactive metal layer 130, thereby forming a dielectric oxide layer at an interface between the oxygen-containing layer 120 and the reactive metal layer 130. The dielectric oxide layer may include an oxide of the metal included in the reactive metal layer 130. As a result, the synapse 100 may undergo the reset operation and the resistance state of the synapse 100 may be changed to a high-resistance state. As the number of voltage pulses applied to the synapse 100 increases, a thickness of the dielectric oxide layer may increase, and thus the synapse 100 may undergo the depression operation such that the electrical conductivity of the synapse 100 may progressively decrease.

In contrast, if voltage pulses with a polarity opposite to the certain polarity are applied to the synapse 100 when the synapse 100 in the high-resistance state, oxygen ions may move in a direction from the reactive metal layer 130 toward the oxygen-containing layer 120, and thus the thickness of the dielectric oxide layer may decrease or the dielectric oxide layer may disappear. As a result, the synapse 100 may undergo the set operation and the resistance state of the synapse 100 may be changed to the low-resistance state. As the number of voltage pulses applied to the synapse 100 increases, the thickness of the dielectric oxide layer may decrease, and the synapse 100 may undergo the potentiation operation such that the electrical conductivity of the synapse 100 may progressively increase.

As described above, as the thickness of the dielectric oxide layer progressively increases or decreases by the voltage pulses applied to the synapse 100, the resistance state of the synapse 100 switches between the high-resistance state and the low-resistance state. Thus, the synapse 100 may have an analog behavior, such that the electrical conductivity of the synapse 100 in each of the high-resistance state and the low-resistance state progressively changes. However, this does not satisfy the characteristics described above with reference to FIGS. 2A to 2D. The characteristics of the synapse 100 will be described in detail with reference to FIGS. 3B and 3C.

Referring to FIG. 3B, if first-polarity voltage pulses are applied to the synapse 100 that is in the low-resistance state, the synapse 100 may undergo the potentiation operation and the electrical conductivity G of the synapse 100 may progressively increase as the number of the voltage pulses increases. However, a rate of increase in the electrical conductivity G is very high in an initial stage of the set operation and gradually decreases as the potentiation operation progresses. Thus, there is a problem in that the linearity of the synapse 100 is not satisfied.

In addition, if second-polarity voltage pulses with a voltage equal to or higher than a reset voltage are applied to the synapse 100 that is the low-resistance state, the reset operation may be performed such that the resistance state of the synapse 100 changes to the high-resistance state. With an increase in the number of second-polarity voltage pulses applied to the synapse 100 in the high-resistance state, the synapse 100 may undergo the depression operation and the electrical conductivity G of the synapse 100 may progressively decrease. However, an abrupt decrease in the electrical conductivity G may occur in the reset and depression operations. In addition, the rate of decrease in the electrical conductivity G is very high in an initial stage of the reset operation and gradually decreases as the depression operation progresses. The degree of decrease in the electrical conductivity G in the initial stage of the reset operation may be much larger than the degree of increase in the electrical conductivity G in the initial stage of the set operation. Thus, as shown in FIG. 3B, there is a problem in that the linearity and symmetry of the synapse 100 are not satisfied.

Referring to FIG. 3C, a rate of change in weight ΔW of the synapse 100 is not constant according to a current resistance R of the synapse 100. In the set operation, if the present resistance value R of the synapse 100 is relatively high (e.g., $R_5$ or $R_6$), the rate of change in the weight ΔW of the synapse 100 may increase in the G+ direction. In other words, in the initial stage of the set operation when the synapse 100 has the relatively high resistance, the rate of change in the electrical conductivity G of the synapse 100 may be high. In contrast, in the reset operation when the present resistance value R of the synapse 100 is relatively low (e.g., $R_1$), the rate of change in the weight ΔW of the synapse 100 may increase in the G-direction. In other words, in the initial stage of the reset operation when the synapse 100 has the relatively low resistance, the rate of change in the electrical conductivity G of the synapse 100 may be high. This suggests that the linearity of the synapse 100 is not satisfied.

Additionally, in the initial stage, the rate of change in the weight ΔW in the G− direction is higher than the rate of change in the weight ΔW in the G+ direction, as shown in FIG. 3C. This indicates that the symmetry of the synapse 100 is not satisfied.

The reason why the above-described problems arise are that the rate of change in the resistance value R of the synapse 100 in each of the initial stages of the set and reset operations is high, and that the speed of the reset operation in which the dielectric oxide layer is formed is much higher than the speed of the set operation in which the dielectric oxide layer disappears.

Embodiments of the present disclosure are directed to synapses capable of overcoming the problems of the comparative example.

Figure 4:
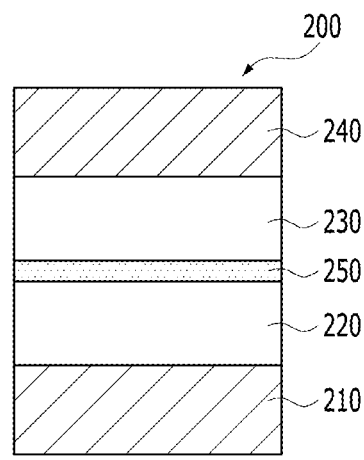
FIG. 4 is a cross-sectional view illustrating a synapse according an embodiment.

FIG. 4 is a cross-sectional view illustrating a synapse 200 according an embodiment.

Referring to FIG. 4, the synapse 200 may include a first electrode 210, a second electrode 240, an oxygen-containing layer 220 disposed between the first electrode 210 and the second electrode 240, a reactive metal layer 230 disposed between the oxygen-containing layer 220 and the second electrode 240, and an oxygen diffusion-retarding layer 250 disposed between the reactive metal layer 230 and the oxygen-containing layer 220.

The first and second electrodes 210 and 240 may be disposed at two ends of the synapse 200, and may be formed of any of various electrically conductive materials, such as metals or metal nitrides. A voltage or current may be applied to the first and second electrodes 210 and 240. The first electrode 210 may be connected to one of the row lines 12 shown in FIG. 1, and the second electrode 240 may be connected to one of the column lines 22 shown in FIG. 1, or vice versa. The synapse 200 may be driven by electrical pulses received by the first and second electrodes 210 and 240. At least one of the first and second electrodes 210 and 240 may be omitted, and one of the row lines 12 or one of the column lines 22 may be substituted for the omitted first electrode 210 or the omitted second electrode 240.

The oxygen-containing layer 220 contains oxygen, and may include any of various metal oxides, such as oxides of transition metals such as Ti, Ni, Al, Nb, Hf, and V; perovskite-based oxides such as PCMO and LCMO; and similar materials. Specifically, in this embodiment, the oxygen-containing layer 220 may include a P-type material.

The reactive metal layer 230 may be a layer capable of reacting with oxygen ions to form a dielectric oxide, and may include a metal such as Al, Ti, Ta, or Mo, or may include a nitride of the metal.

The oxygen diffusion-retarding layer 250 may be sandwiched between the oxygen-containing layer 220 and the reactive metal layer 230, and may retard the movement of oxygen ions from the oxygen-containing layer 220 to the reactive metal layer 230. That is, the oxygen diffusion-retarding layer 250 may slow down the movement of oxygen ions passing from the oxygen-containing layer 220 to the reactive metal layer 230. The oxygen diffusion-retarding layer 250 may include any of various semiconductor materials or any of dielectric materials, such as oxides, nitrides, and combinations thereof. Specifically, the oxygen diffusion-retarding layer 250 may include an N-type material. The oxygen diffusion-retarding layer 250 may interfere with the movement of oxygen ions without completely blocking the movement of oxygen ions, thereby reducing the rate of formation of a dielectric oxide layer in the reactive metal layer 230 at the interface between the reactive metal layer 230 and the oxygen diffusion-retarding layer 250. The oxygen diffusion-retarding layer 250 may have a thickness that does not completely block the movement of oxygen ions. That is, the oxygen diffusion-retarding layer 250 may be sufficiently thin enough to pass the oxygen ions. In an embodiment, oxygen diffusion-retarding layer 250 may have a thickness of less than 10 nm.

Since the oxygen-containing layer 220 includes a P-type material and the oxygen diffusion-retarding layer 250, which is in contact with the oxygen-containing layer 220, includes an N-type material, the oxygen-containing layer 220 and the oxygen diffusion-retarding layer 250 may form a P-N junction. That is, an interface between the oxygen-containing layer 220 and the oxygen diffusion-retarding layer 250 may be a P-N junction.

Figure 5A:
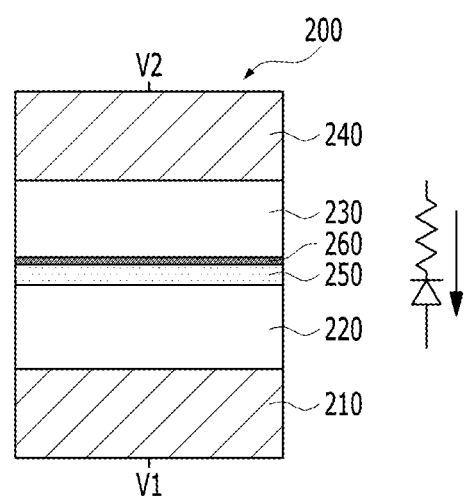
FIG. 5A is a cross-sectional view illustrating a reset operation of the synapse of FIG. 4.
Figure 5B:
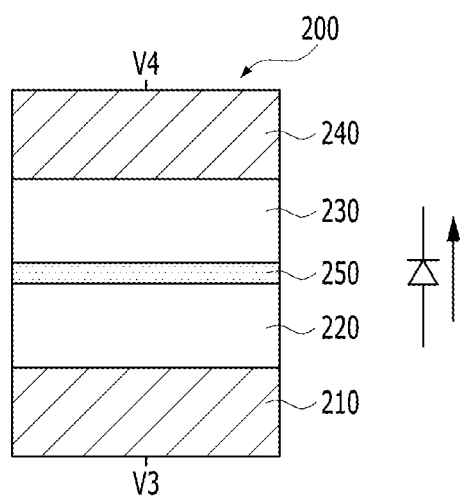
FIG. 5B is a cross-sectional view illustrating a set operation of the synapse of FIG. 4.

Operational methods of the above synapse 200 will be described with reference to FIGS. 5A to 6B. FIG. 5A is a cross-sectional view illustrating a reset operation of the synapse 200 of FIG. 4, and FIG. 5B is a cross-sectional view illustrating a set operation of the synapse 200 of FIG. 4.

Before the synapse 200 of FIG. 4 begins to operate in an initial stage, the synapse 200 may be in a low-resistance state because a dielectric oxide layer between the oxygen-containing layer 220 and the reactive metal layer 230 has not been formed.

Referring to FIG. 5A, when voltage pulses having a certain polarity and a magnitude equal to or larger than a reset voltage are applied to the synapse 200 through the first and second electrodes 210 and 240 when the synapse 200 that is in the low-resistance state, oxygen ions in the oxygen-containing layer 220 may move toward the reactive metal layer 230, and may pass through the oxygen diffusion-retarding layer 250. As a result, a dielectric oxide layer 260 may be formed in the reactive metal layer 230 at the interface between the reactive metal layer 230 and the oxygen diffusion-retarding layer 250, and thus the resistance state of the synapse 200 is changed from the low-resistance state to a high-resistance state. That is, the synapse 200 may undergo the reset operation.

As the number of the voltage pulses applied to the synapse 200 increases, the thickness of the dielectric oxide layer 260 may increase, and thus the electrical conductivity of the synapse 200 may progressively decrease. That is, the synapse 200 may undergo a depression operation.

In FIG. 5A, a resistance component formed by the dielectric oxide layer 260 is indicated by a resistance symbol on the right side of the synapse 200.

A first voltage V1 may be applied to the first electrode 210, and a second voltage V2 may be applied to the second electrode 240. During the reset operation, the second voltage V2 may be greater than the first voltage V1. For example, the second voltage V2 may be a positive voltage having a magnitude that is equal to or larger than the reset voltage, and the first voltage V1 may be a ground voltage. When the first and second voltages V1 and V2 are applied, a reverse voltage may be applied to the P-N junction formed by the oxygen diffusion-retarding layer 250 and the oxygen-containing layer 220. In FIG. 5A, the reverse voltage is indicated by an arrow on the right side of the synapse 200, and the P-N junction is indicated by a diode symbol on the right side of the synapse 200. The effect of the reverse voltage applied to the P-N junction will be described in more detail with reference to FIGS. 6A and 6B.

Referring to FIG. 5B, when voltage pulses, which have an opposite polarity to the voltage pulses applied during the reset operation and have a magnitude equal to or larger than the set voltage, are applied to the synapse 200 when the synapse 200 is in the high-resistance state, oxygen ions may move from the reactive metal layer 230 toward the oxygen-containing layer 220. As a result, the dielectric oxide layer 260 formed in the reactive metal layer 230 may become thinner or may disappear. The resistance state of the synapse 200 may be changed from the high-resistance state to the low-resistance state. That is, the synapse 200 may undergo a set operation.

As the number of the applied voltage pulses having the opposite polarity to the voltage pulses of the reset operation increases, the thickness of the dielectric oxide layer 260 may decrease, and thus the electrical conductivity of the synapse 200 may progressively increase. That is, the synapse 200 may undergo a potentiation operation.

When the dielectric oxide layer 260 is fully removed, the resistance component caused by the dielectric oxide layer 260 may disappear.

During the set operation, third and fourth voltages V3 and V4 may be applied to the first electrode 210 and the second electrode 240 of the synapse 200, respectively. The fourth voltage V4 may be lower than the third voltage V3. For example, the fourth voltage V4 may be a negative voltage having a magnitude equal to or larger than the set voltage, and the third voltage V3 may be a ground voltage. Therefore, a forward voltage may be applied to the P-N junction formed by the oxygen diffusion-retarding layer 250 and the oxygen-containing layer 220. In FIG. 5B, the forward voltage is indicated by an arrow on the right side of the synapse 200, and the P-N junction is indicated by the diode symbol on the right side of the synapse. The effect of the forward voltage applied to the P-N junction will be described in more detail with reference to FIGS. 6A and 6B.

The synapse 200 described with respect to the aforementioned operations is suitable for a neuromorphic device. The thickness of the dielectric oxide layer 260 is progressively increased or decreased by the applied voltage pulses when the resistance state of the synapse 200 switches between the high-resistance state and the low-resistance state. Thus, the synapse 200 may have an analog behavior, in which the electrical conductivity of the synapse 200 in each of the high-resistance state and the low-resistance state progressively changes. Specifically, the rate of formation of the dielectric oxide layer 260 may be reduced by the oxygen diffusion-retarding layer 250, and thus the oxygen diffusion-retarding layer 250 may prevent an abrupt change in a resistance value of the synapse 200 in the initial stage of the reset operation, and may reduce the reset operation speed. As a result, an abrupt change in the electrical conductivity of the synapse 200 in the reset operation may be prevented. Because the electrical conductivity of the synapse 200 does not change abruptly in the set operation, either, the symmetry of the synapse 200 may be improved.

Figure 6A:
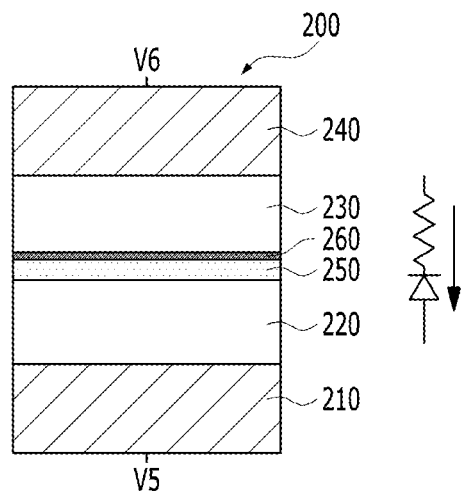
FIG. 6A is a cross-sectional view illustrating a read operation of the synapse of FIG. 4 when the synapse is in a high-resistance state.
Figure 6B:
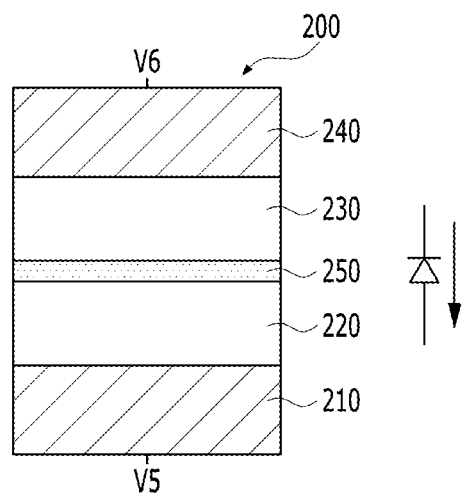
FIG. 6B is a cross-sectional view illustrating a read operation of the synapse of FIG. 4 when the synapse is in a low-resistance state.

FIG. 6A is a cross-sectional view illustrating a read operation of the synapse 200 of FIG. 4 when the synapse 200 is in the high-resistance state. FIG. 6B is a cross-sectional view illustrating a read operation of the synapse 200 of FIG. 4 when the synapse 200 is in the low-resistance state.

Referring to FIG. 6A, during the read operation, read voltage pulses may be applied through the first and second electrodes 210 and 240 to the synapse 200, which is in a high-resistance state. In the high-resistance state, the dielectric oxide layer 260 is disposed in the reactive metal layer 230 at the interface between the reactive metal layer 230 and the oxygen diffusion-retarding layer 250. A magnitude of the read voltage pulses may be smaller than a magnitude of reset voltage pulses, and a polarity of the read voltage pulses may be substantially the same as a polarity of the reset voltage pulses. Accordingly, a reverse voltage may be applied to the P-N junction formed by the oxygen-containing layer 220 and the oxygen diffusion-retarding layer 250. In other words, during the read operation when the synapse 200 is in the high-resistance state, a fifth voltage V5 applied to the first electrode 210 of the synapse 200 is less than a sixth voltage V6 applied to the second electrode 240 of the synapse 200. In an embodiment, the sixth voltage V6 may be a positive voltage having a magnitude smaller than the reset voltage, and the fifth voltage V5 may be a ground voltage.

When the reverse voltage is applied to the P-N junction of the synapse 200 during the read operation, the resistance value of the synapse 200 in the high-resistance state may increase. Therefore, the rate of change in the resistance value of the synapse 200 may decrease as the number of pulses applied to the synapse 200 increases. As a result, an abrupt change in the resistance value of the synapse 200 in an initial stage of the reset operation may be further prevented, and thus the linearity of the synapse 200 may be improved.

Referring to FIG. 6B, during a read operation when the synapse 200 is in a low-resistance state, read voltage pulses may be applied through the first and second electrodes 210 and 240 to the synapse 200. The synapse 200 is in the low-resistance state when the dielectric oxide layer 260 does not exist in the reactive metal layer 230 at the interface between the reactive metal layer 230 and the oxygen diffusion-retarding layer 250. A magnitude and a polarity of the read voltage pulses may be consistent regardless of the resistance state of the synapse 200. That is, regardless of whether the read operation is performed when the synapse 200 is in the high-resistance state or the low-resistance state, the fifth voltage V5 applied to the first electrode 210 may be lower than the sixth voltage V6 applied to the second electrode 240.

In the read operation when the synapse 200 is in the low-resistance state, unlike the set operation, a reverse voltage may be applied to the P-N junction. The reverse voltage is indicated in FIG. 6B by an arrow on the right side of the synapse 200. Therefore, the resistance value of the synapse 200 in the low-resistance state may increase when the read operation is performed, and the rate of change in the resistance value of the synapse 200 may decrease as the number of pulses applied to the synapse 200 increases. As a result, an abrupt change in the resistance value of the synapse 200 in the initial stage of the set operation may be further prevented, and thus the linearity of the synapse 200 may be improved.

In summary, since the reverse voltage is applied to the P-N junction of the synapse 200 regardless of the resistance state of the synapse 200 during the read operation, the resistance value of the synapse 200 may increase whenever the read operation is performed. The rate of change in the resistance value of the synapse 200 may decrease when the number of applied pulses increases, and thus the linearity of the synapse 200 may be further improved.

The neuromorphic device according to the above-described embodiments may be used in various devices or systems. This will be described by way of example with reference to FIG. 7.

Figure 7:
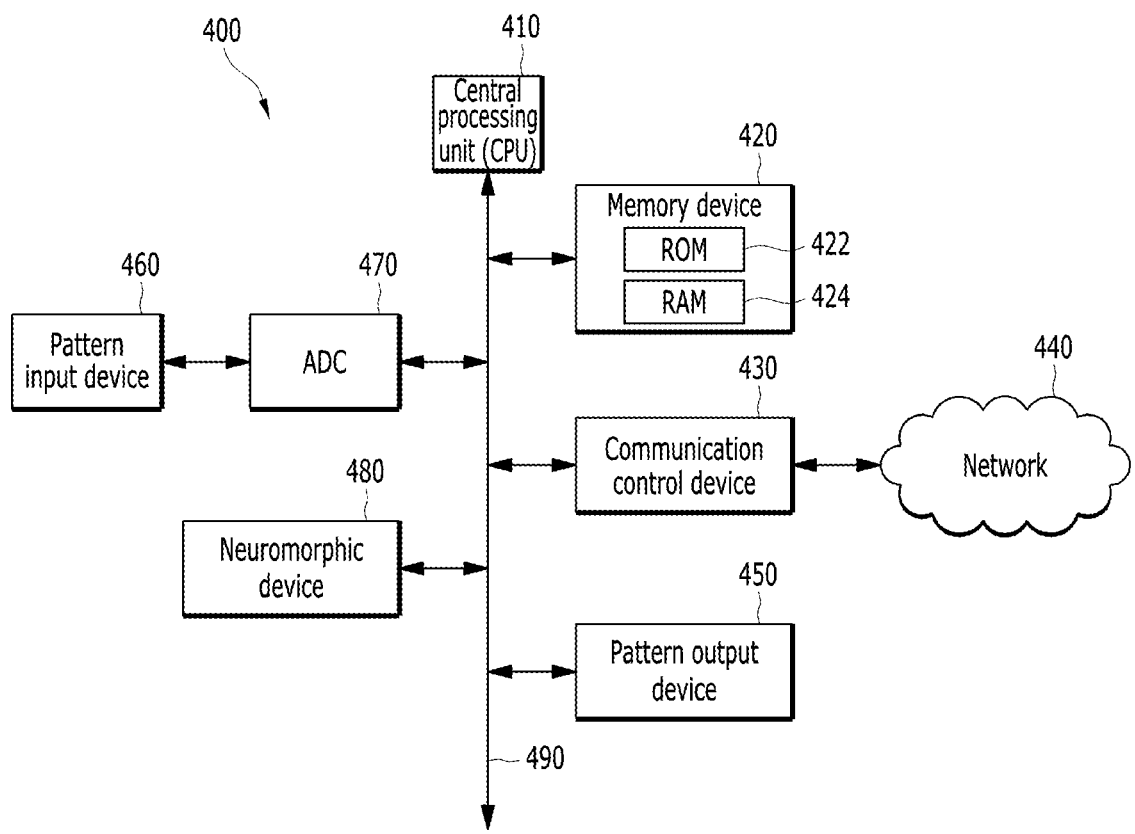
FIG. 7 shows a pattern recognition system according to an embodiment.

FIG. 7 shows a pattern recognition system 400 according to an embodiment.

The pattern recognition system 400 may be a system for recognizing various patterns, such as a speech recognition system or an image recognition system. The pattern recognition system 400 may be configured with the neuromorphic device of the above-described embodiments.

Referring to FIG. 6, the pattern recognition system 400 may include a central processing unit (CPU) 410, a memory device 420, a communication control device 430, a pattern output device 450, a pattern input device 460, an analog-digital converter (ADC) 470, a neuromorphic device 480, a bus line 490, and the like. The pattern recognition system 400 is connected to a network 440 through the communication control device 430.

The central processing unit 410 may generate and transmit various signals used in a learning operation performed by the neuromorphic device 480, and may perform various processing operations for recognizing patterns of sound, images or the like based on an output of the neuromorphic device 480. This central processing unit 410 may be connected, via the bus line 490, to the memory device 420, the communication control device 430, the pattern output device 450, the analog-digital converter 470, and the neuromorphic device 480.

The memory device 420 may store information in accordance with operations of the pattern recognition system 400. For this, the memory device 420 may include different memory devices. For example, the memory device 420 may include a ROM device 422, a RAM device 424, and the like. The ROM device 422 may store various programs or data which are used in the central processing unit 410 in order to perform the learning operation of the neuromorphic device 480, pattern recognition, etc. The RAM device 424 may store the program or data downloaded from the ROM device 422, or store data, such as sound or images, which have been converted or analyzed by the analog-digital converter 470.

The communication control device 430 may exchange recognized data (e.g., sound or images) with other communication control devices through the network 440.

The pattern output device 450 may output the recognized data (e.g., sound or images) in various manners. For example, the pattern output device 450 may include one or more of a printer, a display unit, and the like, and may output sound waveforms or display images.

The pattern input device 460 may receive analog-type sound, images, etc., and may include one or more of a microphone, a camera, etc.

The analog-digital converter 470 may convert analog data, provided by the pattern input device 460, to digital data, and may also analyze the digital data.

The neuromorphic device 480 may perform learning, recognition, and the like using data provided by the analog-digital converter 470, and may output data corresponding to recognized patterns. The neuromorphic device 480 may include one or more neuromorphic devices that include synapses of the embodiments described above. For example, the neuromorphic device 480 may include a plurality of synapses, and each of the plurality of synapses may include a first electrode; a second electrode spaced apart from the first electrode; an oxygen-containing layer disposed between the first electrode and the second electrode, the oxygen-containing layer including a P-type material and oxygen ions; a reactive metal layer disposed between the oxygen-containing layer and the second electrode, the reactive metal layer reacting with the oxygen ions of the oxygen-containing layer; and an oxygen diffusion-retarding layer disposed between the reactive metal layer and the oxygen-containing layer, the oxygen diffusion-retarding layer including an N-type material and interfering with a movement of the oxygen ions from the oxygen-containing layer to the reactive metal layer, and wherein an interface between the oxygen-containing layer and the oxygen diffusion-retarding layer is a P-N junction. By using this configuration, the symmetry and linearity of the electrical conductivity of a synapse can be ensured. Accordingly, operating characteristics of the neuromorphic device 480 can be improved, and thus operating characteristics of the pattern recognition system 400 may also be improved.

The pattern recognition system 400 may further include other components required for properly performing its function(s). For example, the pattern recognition system 400 may further include one or more input devices such as a keyboard, a mouse, and the like, so as to receive various parameters and/or setting conditions for operations of the pattern recognition system 400.

According to the embodiments as described above, the symmetry and linearity of the electrical conductivity of the synapse may be enhanced, and thus the operating characteristics of the neuromorphic device may be improved.

While the present invention has been described with respect to the specific embodiments, it will be apparent to those skilled in the art that various changes and modifications may be made without departing from the spirit and scope of the invention as defined in the following claims.

What is claimed is:

1. A synapse, comprising:
   a first electrode;
   a second electrode spaced apart from the first electrode;
   an oxygen-containing layer disposed between the first electrode and the second electrode, the oxygen-containing layer including a P-type material and oxygen ions;
   a reactive metal layer disposed between the oxygen-containing layer and the second electrode, the reactive metal layer reacting with the oxygen ions of the oxygen-containing layer; and
   an oxygen diffusion-retarding layer disposed between the reactive metal layer and the oxygen-containing layer, the oxygen diffusion-retarding layer including an N-type material and interfering with a movement of the oxygen ions from the oxygen-containing layer to the reactive metal layer, and wherein an interface between the oxygen-containing layer and the oxygen diffusion-retarding layer is a P-N junction.

2. The synapse of claim 1, wherein the synapse undergoes a reset operation when a reset voltage is applied to the synapse through the first electrode and the second electrode, the reset operation including forming or thickening a dielectric oxide layer in the reactive metal layer at an interface between the reactive metal layer and the oxygen diffusion-retarding layer, the reset voltage having a first polarity, and wherein the synapse undergoes a set operation when a set voltage is applied to the synapse through the first electrode and the second electrode, the set operation including removing or thinning the dielectric oxide layer, the set voltage having a second polarity opposite to the first polarity.

3. The synapse of claim 2, wherein, during the reset operation, a reverse voltage is applied to the P-N junction, and wherein during the set operation, a forward voltage is applied to the P-N junction.

4. The synapse of claim 2, wherein the synapse undergoes a read operation when a read voltage is applied to the synapse through the first electrode and the second electrode, the read voltage having the first polarity and a magnitude that is smaller than a magnitude of the reset voltage.

5. The synapse of claim 4, wherein, during the read operation, a reverse voltage is applied to the P-N junction.

6. The synapse of claim 2, wherein as a thickness of the dielectric oxide layer increases, an electrical conductivity of the synapse decreases, and wherein as the thickness of the dielectric oxide layer decreases, the electrical conductivity of the synapse increases.

7. The synapse of claim 2, wherein, during the reset operation, a thickness of the dielectric oxide layer increases when a number of pulses of the reset voltage applied to the synapse increases, and wherein during the set operation, the thickness of the dielectric oxide layer decreases when a number of pulses of the set voltage applied to the synapse increases.

8. The synapse of claim 7, wherein, during the reset operation, the pulses of the reset voltage have a constant width and a constant magnitude, and wherein, during the set operation, the pulses of the set voltage have a constant width and a constant magnitude.

9. The synapse of claim 1, wherein the oxygen diffusion-retarding layer has a thickness that incompletely blocks the movement of the oxygen ions.

10. The synapse of claim 1, wherein the oxygen diffusion-retarding layer comprises a dielectric material, a semiconductor material, or a combination of the dielectric material and the semiconductor material.

11. The synapse of claim 1, wherein the synapse undergoes a depression operation when a number of first electrical pulses applied to the synapse through the first and second electrodes increases, an electrical conductivity of the synapse decreasing during the depression operation, the first electrical pulses having a first polarity, and wherein the synapse undergoes a potentiation operation when a number of second electrical pulses applied to the synapse through the first and second electrodes increases, an electrical conductivity of the synapse increasing during the potentiation operation, the second electrical pulses having a second polarity opposite to the first polarity.

12. The synapse of claim 11, wherein a change in the electrical conductivity of the synapse in the potentiation operation is substantially symmetric with a change in the electrical conductivity of the synapse in the depression operation.

13. The synapse of claim 11, wherein a rate of change in the electrical conductivity of the synapse in the potentiation operation is substantially constant, and a rate of change in the electrical conductivity of the synapse in the depression operation is substantially constant.

14. The synapse of claim 11, wherein the first electrical pulses have a constant width and a constant magnitude, and the second electrical pulses have a constant width and a constant magnitude.

15. The synapse of claim 11, wherein the electrical conductivity of the synapse is constant when third electrical pulses are applied to the first and second electrodes, the third electrical pulses having the first polarity or the second polarity, at least one of a width and a magnitude of each of the third electrical pulses being less than a certain critical value.

16. A neuromorphic device comprising:
a first neuron;
a second neuron;
a first line connected to the first neuron, the first line extending in a first direction;
a second line connected to the second neuron, the second line extending in a second direction and intersecting the first line; and
a synapse disposed between the first line and the second line and located in an intersection region between the first line and the second line,
wherein the synapse comprises:
an oxygen-containing layer including a P-type material and oxygen ions;
a reactive metal layer disposed between the oxygen-containing layer and the second line, the reactive metal layer reacting with the oxygen ions of the oxygen-containing layer; and
an oxygen diffusion-retarding layer disposed between the reactive metal layer and the oxygen-containing layer, the oxygen diffusion-retarding layer including an N-type material and interfering with a movement of the oxygen ions from the oxygen-containing layer to the reactive metal layer, and
wherein an interface between the oxygen-containing layer and the oxygen diffusion-retarding layer is a P-N junction.

17. The neuromorphic device of claim 16, wherein the synapse undergoes a reset operation when a reset voltage is applied to the synapse through the first line and the second line, the reset operation including forming or thickening a dielectric oxide layer in the reactive metal layer at an interface between the reactive metal layer and the oxygen diffusion-retarding layer, the reset voltage having a first polarity, and wherein the synapse undergoes a set operation when a set voltage is applied to the synapse through the first line and the second line, the set operation including removing or thinning the dielectric oxide layer, the set voltage having a second polarity opposite to the first polarity.

18. The neuromorphic device of claim 17, wherein, during the reset operation, a reverse voltage is applied to the P-N junction, and wherein during the set operation, a forward voltage is applied to the P-N junction.

19. The neuromorphic device of claim 17, wherein the synapse undergoes a read operation when a read voltage is applied to the synapse through the first line and the second line, the read voltage having the first polarity and having a smaller magnitude than the reset voltage.

20. The neuromorphic device of claim 19, wherein, during the read operation, a reverse voltage is applied to the P-N junction.

21. The neuromorphic device of claim 17, wherein, during the reset operation, a thickness of the dielectric oxide layer increases when a number of pulses of the reset voltage increases, and wherein during the set operation, the thickness of the dielectric oxide layer decreases when a number of pulses of the set voltage increases.

22. The neuromorphic device of claim 21, wherein, during the reset operation, the pulses of the reset voltage have a constant width and a constant magnitude, and wherein during the set operation, the pulses of the set voltage have a constant width and a constant magnitude.

* * * * *